July 11, 1967     A. H. WAKEMAN ETAL     3,330,127
AERATING AND REFRIGERATING APPARATUS
Filed Oct. 21, 1963     2 Sheets-Sheet 1
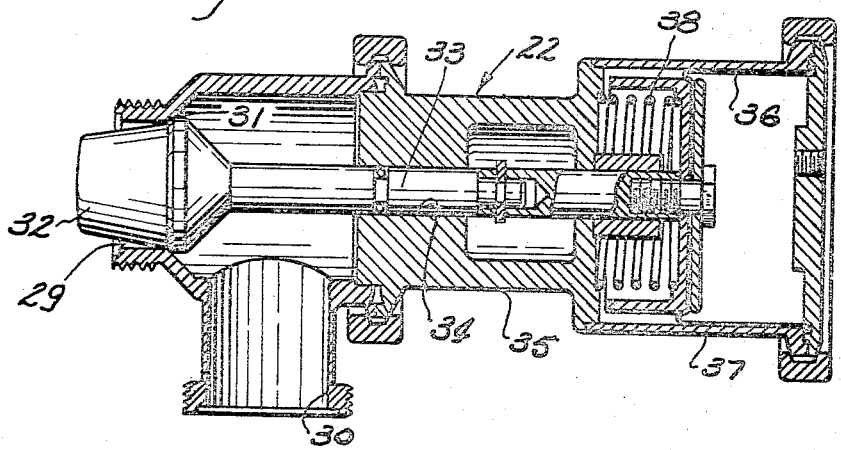
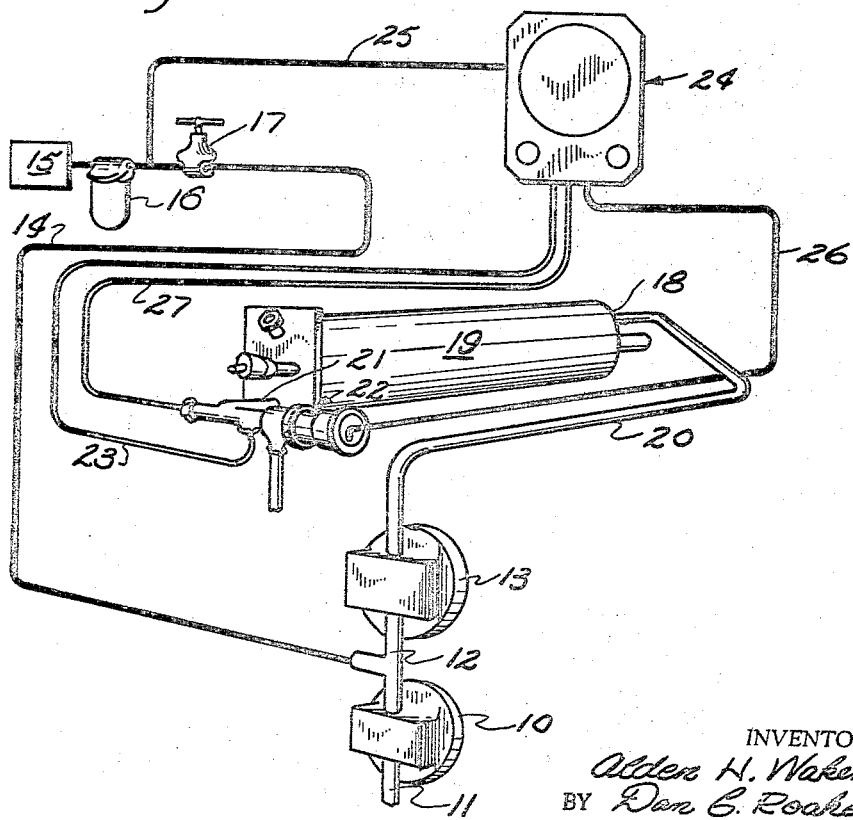
INVENTOR.
Alden H. Wakeman
BY Dan C. Roalen
Pendleton, Neuman,
Seibold & Williams
Attys.

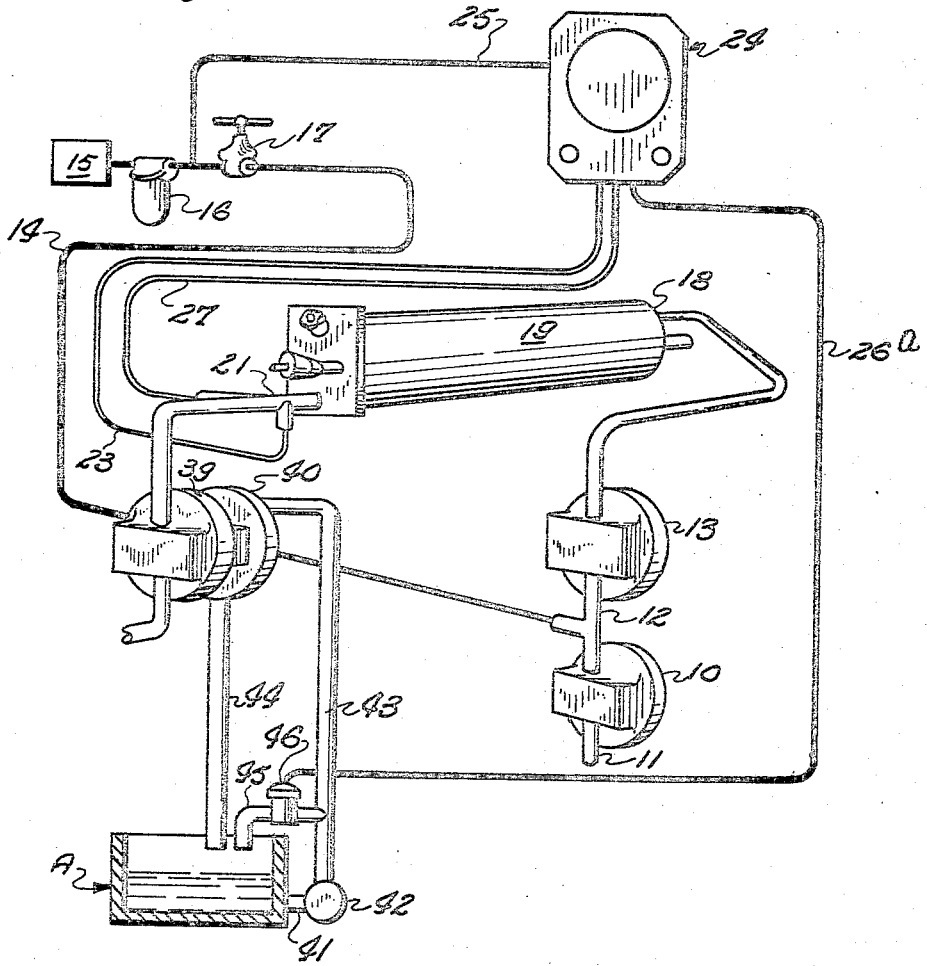

United States Patent Office 3,330,127
Patented July 11, 1967

3,330,127
AERATING AND REFRIGERATING APPARATUS
Alden H. Wakeman, Lake Mills, and Dan C. Roahen, Fort Atkinson, Wis., assignors, by mesne assignments, to St. Regis Paper Company, New York, N.Y., a corporation of New York
Filed Oct. 21, 1963, Ser. No. 317,571
8 Claims. (Cl. 62—136)

This invention relates to an aerating and refrigerating apparatus of a type such as is used in commercial dairies for the continuous manufacture of ice cream and the like, and more particularly to the control of pressure of the product in the aerating and refrigerating chamber.

Wakeman U.S. Patent No. 2,946,205 discloses aerating and refrigerating apparatus of the type to which this invention pertains. In such apparatus, a first pump pumps the liquid product to a second pump of somewhat greater capacity with gaseous fluid (air) being introduced between the pumps, and the second pump discharges the mixture of liquid and fluid into a chamber where it is aerated and refrigerated. The mixture passes through the chamber under pressure during the aerating and refrigerating process, and is discharged through an outlet from the chamber.

In accordance with the Wakeman patent the aerated and refrigerated mix from the chamber is picked up by a third pump somewhat smaller than the second pump and is discharged from the system to a filling machine or other selected point.

The proportional capacity of the third pump to the second pump is relied upon to maintain a constant pressure in the processing chamber.

The general purpose of the present invention is to provide another means for controlling the pressure in the processing chamber, and to effect such control, regardless of down-stream pressure fluctuations, at least so long as the down-stream pressure is lower than the chamber pressure.

Overrun is the percent volume increase of the product during the aerating and freezing process so that neglecting changes in density due to reduction in temperature and freezing, the overrun is the percent of air to initial volume of product incorporated. Overrun affects the palatability of ice cream and, of course, reduces the cost per gallon. Often there are legal limits to overrun. It is therefore important from quality, economic and legal considerations to control the overrun within close limits.

Overrun is affected by the composition of the mix, the rate of freezing, the efficiency of whipping, and the pressure in the freezing chamber. The pressure is one of the important factors, so that the ability to adjust and maintain the pressure in the freezing chamber constant is an essential in the control of overrun.

It is an object of this invention to provide an aerating and refrigerating apparatus in which the pressure in the processing chamber can be accurately adjusted for producing desired overrun for a specific product and processing conditions.

It is a further object that the pressure in the processing chamber can be held uniformly constant to avoid overrun fluctuations.

It is another object to provide rapid and simple adjustment means to alter the pressure in the processing chamber in order to compensate for changes in other variable factors affecting overrun.

It is another object to provide convenient and accurate means of adjusting the rate of flow of the product through the apparatus.

It is another object to provide means for adjusting the percent of air introduced.

Further and additional objects will appear from the description, accompanying drawings and appended claims.

In carrying out this invention in one illustrative form, an aerating and refrigerating apparatus of the general type outlined above is provided with a pressure regulating valve at the outlet of the freezing chambers. Pressure sensing means responsive to the chamber pressure controls a supply of air under pressure to a spring-biased diaphragm type regulator connected to the valve member to adjust the valve opening and thereby to provide the desired control, regardless of fluctuations of downstream conditions and pressures.

For a more complete understanding of this invention reference should be made to the example illustrated in the drawings, wherein:

FIG. 1 is a schematic diagram of apparatus employing teachings of this invention, FIG. 2 is an enlarged cross-sectional view of the pneumatically operated product outlet valve of the apparatus in FIG. 1, and FIG. 3 is a schematic diagram of a modification of the apparatus of FIG. 1, also employing teachings of this invention.

Referring now to FIG. 1, 10 is a first pump of a positive displacement type and is adapted to communicate with a suitable liquid supply (not shown) through conduit 11. The liquid, when the improved apparatus is being utilized for the making of ice cream, constitutes ice cream mix. Serially connected to the discharge of the pump 10 by conduit 12 is a second pump 13 which is also of the positive displacement type.

Conduit 14 is connected to a source of compressed air 15 and to conduit 12 between the first pump 10 and the second pump 13. An air filter 16 may be provided in this line. An air pressure regulator 17 provides selective adjustment of the pressure of the air injected between the two pumps through line 14.

The discharge or outlet of second pump 13 is connected to the inlet end 18 of an elongated cylindrically shaped refrigerated freezer chamber 19 by a conduit 20. Chamber 19 has disposed therein a rotating dasher and beater member, which may be of a type similar to that disclosed in United States Patent No. 2,210,366. The dasher serves to scrape frozen product from the chamber and, together with the beater effects whipping or aeration of the mix as it moves longitudinally through the chamber 19. The outlet end 21 of chamber 19 is connected to a pneumatically operated control valve 22.

A tube 23 is connected to the outlet 21 and to the pressure responsive element of a pneumatic pressure controller 24. When the product being processed is ice cream, for sanitary reasons the inside of the tube 23 cannot be exposed to the product and it may therefore be fitted at the end connected to outlet 21 with a diaphragm or other suitable type of collapsible head exposed to the pressure of the product. The tube 23 is filled with a fluid which transmits the pressure at 21 to the pressure responsive element of controller 24; however, the liquid pressure may be transmitted to the controller by any suitable means. Conduit 25 connects the controller 24 to a source of compressed air.

The pressure from the chamber 19 as transmitted to the controller through conduit 23 causes the deflection of a Bourdon tube, bellows or other flexible member which is deformed by pressure changes. The movement of such flexible member serves to operate a needle valve connected to air pressure line 25 which in conjunction with an air bleed modulates the pressure in conduit line 26. Line 26 is connected to the controller 24 and to the automatic valve 22, whereby the pressure therein controls the degree of opening of valve 22 to control the pressure in chamber 19 at a predetermined value. The controller 24 is a regular article of commerce made by several manufacturers with appropriate modifications; the Taylor Fulscope Pressure Controller marketed by Taylor Instrument Companies of Rochester, N.Y., being one example. Accordingly, the controller is not shown here in detail. Appropriate adjustments normally provided for the pressure responsive elements of such controllers permit making adjustments of the operating pressure in line 26 and hence in the chamber 19.

A temperature sensing bulb is inserted at the product outlet 21 and connected to the controller 24 by a capillary tube 27. Normally the controller 24 controls only in accordance with pressure as transmitted through the tube 23, but may be indicating and recording both as to pressure and temperature.

As previously described the second pump 13 is of greater capacity than the first pump 10. The capacity of the pump 10 determines the rtae of flow of liquid product to the apparatus. The volumetric rate of flow of air is the difference in the capacity of the two pumps. For example if pump 10 has a capacity 10% less than pump 13, then the volume of air introduced will be 10% of the volume of mix. The volumetric flow rate of mix is substantially constant irrespective of the pressure since the liquid is substantially incompressible. In contrast, however, the density of the air introduced is substantially proportional to its absolute pressure, and the weight rate of flow of air into the apparatus therefore can be increased or decreased by adjusting the air pressure regulator 17 to a higher or lower pressure. Due to the difference in capacity between the pumps 10 and 13, and the ability to control the pressure of the introduced air, it is possible to adjust the proportion of air introduced into the mix.

The pumps 10 and 13 are of variable speed, or capacity, but are connected together so that the ratio of their capacities remains constant, i.e., if pump 13 has a capacity 10% greater than pump 10 this ratio remains constant regardless of whether the pumps are running at high or low speed. Accordingly, for a given air pressure setting in line 14 the proportion of air introduced into the mix will remain the same regardless of the speed of the pumps, but the through-put of ice cream mix, that is the output of the freezer, is adjustable by changing the speed of the pump.

While the amount and uniformity of air actually absorbed by the freezing mix in the chamber 19 is a factor of the efficiency of the mixing and whipping action of the dasher and beater, it is also a function of the pressure as well as the temperature within the chamber 19. For this reason it is important that the pressure within the chamber 19 be controlled at a constant value to maintain uniformity of overrun, irrespective of pressure fluctuations on the down-stream side.

Referring now to FIG. 2, the illustrated valve 22 includes an inlet passage 29 to be connected to the outlet 21 of the freezing chamber, an outlet passage 30 to be connected to suitable product distribution and/or filling means (not shown), a valve seat at 31, and a movable valve member 32 of longitudinally varying cross-sectional area. An operating rod 33 connected to valve member 32 passes through a bore 34 in valve body 35 and is connected to a deformable operating diaphragm or bellows 36 in a hollow cylinder 37. A compression spring 38 provides a predetermined bias of the valve to its open position. Line 26 is connected to cylinder 37 whereby the pneumatic pressure from the line 26 acts on diaphragm 36 to adjust the position of valve 32 in relation to seat 31.

As the speed of the pumps is varied, there will be a corresponding tendency to increase or decrease the pressure in chamber 19. Similarly, any changes in conditions downstream from valve 22 which alter the resistance to flow of the product will tend to alter the back-pressure at outlet 21 and to cause corresponding variations in the chamber pressure. However, with the present invention, such changes in chamber pressure will be sensed by the controller and will automatically result in changes of the pneumatic pressure in line 26 and cylinder 37 to provide compensating adjustments of valve 32. The valve 22 will thus be automatically adjusted to maintain a predetermined chamber pressure without the intervention of the operator. Should it become desirable to change the selected operating pressure in the chamber to provide the characteristics desired in various specific products, such change can be conveniently, quickly and simply made by appropriate adjustment of the controller to alter the pressure response in line 26 relative to the pressure sensed through tube 23.

Referring now to FIG. 3, the third pump 39 of a positive displacement type is connected to the outlet 21 of the freezing chamber and is driven by hydraulic motor 40. Tank A contains a supply of hydraulic fluid. Line 41 supplies fluid to pump 42 which discharges through line 43 to motor 40. The fluid in passing through drives the motor 40 at a speed proportional to the flow rate. Spent fluid returns to the tank A through pipe 44. From line 43, line 45 provided with regulating valve 46 bypasses a portion of the hydraulic fluid delivered by pump 42 back to tank A. Air line 26a leads from controller 24 to valve 46 so as to adjust the degree of opening and thereby control the flow of bypassed fluid so as to regulate the speed of pump 39. Increasing or decreasing the speed of pump 39 has the same effect as opening or closing valve 22 in regulating the pressure in the freezing chamber 19.

It will thus be seen that aerating and refrigerating apparatus has been provided wherein the pressure in the processing (freezing) chamber may be accurately adjusted and automatically held uniformly constant to afford accurate control of overrun. This is accomplished through a control system which also permits convenient and simple adjustments of the predetermined operating pressure in the processing chamber. Further this apparatus permits convenient and accurate control of the percent of gases introduced into the product and of the rate of flow of the product through the processing chamber.

While a particular embodiment of the invention has been shown it will be understood of course that the invention is not limited thereto since many modifications may be made by those skilled in this art, particularly in light of the teachings described and illustrated herein, it is therefore contemplated by the appended claims to cover any such modifications as fall within the true spirit and scope of the invention.

We claim:

1. Apparatus for refrigerating a readily solidifiable liquid comprising a refrigerated chamber through which such liquid is circulated, said chamber having an inlet and an outlet for such liquid, pump means connected to said inlet for supplying such liquid under pressure, a power operated pressure regulator valve on said outlet, means for conveying operating power and control means intermediate said valve and said power conveying means and cooperating with same to respond to the pressure within said chamber and controlling the power to said valve for adjusting said valve and maintaining a predetermined pressure within said chamber.

2. Apparatus for refrigerating a readily solidifiable liquid comprising a refrigerated chamber through which such liquid is circulated, said chamber having an inlet and an outlet for such liquid, pump means of variable capacity connected to said inlet for supplying such liquid thereto under pressure, a power operated pressure regulator valve on said outlet, a source of operating power, and control means intermediate said valve and said power source and cooperating with same to respond to the pressure within said chamber and controlling the power to said valve for adjusting said valve and maintaining a predetermined pressure within said chamber.

3. Apparatus for refrigerating a readily solidifiable liquid comprising a refrigerated chamber through which such liquid is circulated, said chamber having an inlet and outlet for such liquid, first and second pumps, conduit means connecting said pumps in series to said inlet for supplying such liquid under pressure, variable pressure air supply means connected to said conduit means between said pumps, valve means on said outlet, and means associated with said valve means and air supply means responsive to the pressure within said chamber for maintaining a predetermined pressure in said chamber regardless of changes in downstream pressure.

4. Apparatus for aerating and refrigerating a readily solidifiable liquid comprising a refrigerated chamber through which such liquid is circulated and in which such liquid is simultaneously agitated and refrigerated, said chamber having an inlet and outlet for such liquid, first and second pumps, conduit means connecting said pumps in series to said inlet for supplying such liquid under pressure, variable pressure air supply means connected to said conduit means between said pumps, a power operated pressure regulator valve on said outlet, and control means responsive to the pressure in said chamber and cooperating with said air supply means to supply power to said regulator valve for maintaining a predetermined pressure in said chamber.

5. Apparatus for aerating and refrigerating a readily solidifiable liquid comprising a refrigerated chamber through which such liquid is circulated and in which such liquid is simultaneously agitated and refrigerated, said chamber having an inlet and outlet for such liquid, first and second pumps, conduit means connecting said pumps in series to said inlet for supplying such liquid under pressure, variable pressure air supply means connected to said conduit means between said pumps, a pneumatically controlled regulator valve on said outlet, and control means responsive to the pressure in said chamber and cooperating with said air supply means to supply air to said regulator valve under controlled pressure for maintaining a predetermined pressure in said chamber.

6. Apparatus as in claim 1 and wherein said valve means includes an inlet passage and an outlet passage, said inlet passage being in communication with said chamber outlet, a valve member positioned in said inlet passage, a pneumatic operator connected to said valve member, and means for sensing the pressure in said chamber and operating said pneumatic operator in response thereto to maintain a predetermined pressure in said chamber.

7. Apparatus for refrigerating a readily solidifiable liquid comprising a refrigerated chamber through which such liquid is circulated, said chamber having an inlet and outlet for such liquid, first and second pumps, conduit means connecting said pumps in series to said inlet for supplying such liquid under pressure, variable pressure air supply means connected to said conduit means between said pumps, and third pump means on said outlet, an adjustable speed drive, means sensing pressure within said chamber and controlling the speed of said drive responsive to the pressure within said chamber, said drive including means for driving said third pump means for maintaining a predetermined pressure in said chamber.

8. Apparatus for aerating and refrigerating a readily solidifiable liquid comprising a refrigerated chamber through which such liquid is circulated and in which such liquid is simultaneously agitated and refrigerated, said chamber having an inlet and outlet for such liquid, first and second pumps, conduit means connecting said pumps in series to said inlet for supplying such liquid under pressure, variable pressure air supply means connected to said conduit means between said pumps, a third pump connected to said outlet, a variable speed motor driving said third pump, and control means responsive to the pressure in said chamber to adjust said variable speed motor for maintaining a predetermined pressure in said chamber.

References Cited

UNITED STATES PATENTS 2,309,424   1/1943    Weinreich et al.
2,946,205   7/1960    Wakeman _____ 62—304
3,051,456   8/1962    Clarke et al.

HARRY B. THORNTON, *Primary Examiner.*

RONALD R. WEAVER, *Examiner.*